A. A. HOLLE.
AEROPLANE.
APPLICATION FILED FEB. 10, 1913.

1,115,073.

Patented Oct. 27, 1914.
5 SHEETS—SHEET 1.

WITNESSES
U. S. J. Dunbar
H. E. Bready

INVENTOR
A. A. Holle.
By Percy H. Moore
Attorney

UNITED STATES PATENT OFFICE.

ALEXANDER ALBERT HOLLE, OF OLST, NETHERLANDS.

AEROPLANE.

1,115,073. Specification of Letters Patent. Patented Oct. 27, 1914.

Application filed February 10, 1913. Serial No. 747,370.

*To all whom it may concern:*

Be it known that I, ALEXANDER ALBERT HOLLE, a subject of the Queen of the Netherlands, residing at Haere House, Olst, Netherlands, have invented certain new and useful Improvements in and Relating to Aeroplanes, of which the following is a specification.

This invention relates to aeroplanes of the type in which the wing planes each comprise a series of sections mounted on an articulated structure capable of being folded in relation to one another and to the body of the machine in a similar manner to the wings of birds, and it consists of an improved construction of the articulated structure, the object being to enable the parts of the articulated structure to be mechanically manipulated for the purpose of flexing or extending the wing planes during flight, for the purpose of altering the frontal aspect, the leverage, and the surface area of the planes, without sacrificing the rigidity and strength of the planes in all or any of the shapes and positions which they may assume during flexion or extension.

I attain the objects of this invention by the employment of a structure for each wing plane, which is adapted to carry the supporting surfaces of the planes proper. Each said structure consists of a series of rigid members articulated to one another by pivots the axes of which are either at right angles or approximately so to the surfaces of the planes, or which are at such an angle thereto that they converge so as to meet at a point beneath the planes. The inner member of the structure of each plane is attached to the body of the machine by a joint so constructed and arranged that said section—and with it the other members of the structure—can be moved in relation to the body of the machine for the purpose of varying the area, leverage, and frontal aspect of the plane, and for varying its angle of direction and its dihedral angle.

The members of the articulated structure are constructed so as to give a maximum of strength with a minimum weight, and those of each plane are relatively arranged so that they lie when opened either in the same plane or so as to form a predetermined curve. The movements of the members of each structure are controlled by suitable cables which are so arranged that they operate also as tension stays.

In the accompanying drawings, which are diagrammatic only and show by way of example one method of carrying this invention into practice.

The arrow between Figs. 2 and 3 shows the direction of flight.

Throughout the views similar parts are marked with like letters of reference.

The articulated structure consists of three members $a$, $b$ and $c$, the latter of which may be made in two lengths $c$ and $c^1$ as shown in the accompanying drawings. The member $a$ is pivoted to the body of the machine by any suitable form of universal joint, and the members $b$ $c$ and $c^1$ are pivoted to the members $a$ $b$ and $c$ respectively by joints of such a construction that said members are capable of movement relative to one another and to the frame or body of the machine in the horizontal plane, the second member folding forward in the direction of flight and the third or outer member folding in the reverse direction, i. e. backward in relation to the direction of flight. A suitable form of universal joint for connecting each of the members $a$ to the frame or body of the machine is that shown in Figs. 3 and 4 of the accompanying drawing, which consists of a combination of a universal joint $v^*$ with an axially arranged swivel bearing. The member $a$ of the articulated structure is being connected to the axis $v$ of the universal joint, said axis being arranged in the vertical or approximately vertical plane, and the other aixs $v^1$ of said joint is carried by a frame $y$ mounted on a sleeve $y^1$ which is freely mounted on a stud or projecting axle $x^3$ carried by the frame or body of the machine.

The member $b$ is pivoted to the outer end of the member $a$ by a pin $w$ or its equivalent and is provided with a second member $b^1$ arranged in parallel or approximately parallel relation in the horizontal plane to said member $b$. The inner end of this second member $b^1$ is connected to the member $b$ at or near the pivot $w$ by a coupling which will in all positions of the member $b$ relative to the member $a$ cause any inward thrust on the member $b^1$ to be imparted to the member $a$. A convenient coupling is that illustrated which comprises a link $d$ by which the inner end of $b^1$ is anchored to the member $b$, and a pin $e$ carried by the inner end of the member $b^1$ which engages a slot $f$ in a flange $a^1$ on the outer end of the member $a$, said slot being eccentrically arranged in relation to the axis of the pin $w$ by which the member $b$ is pivoted to the member $a$.

Figures 7, 8:
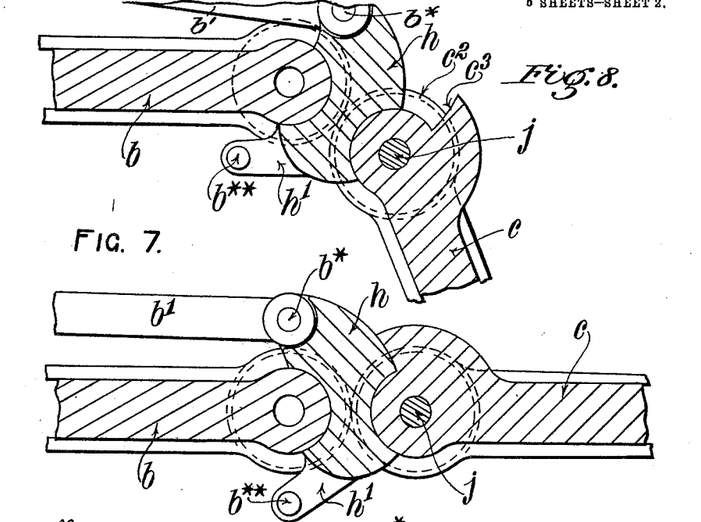
Fig. 7 is a broken view in section of said joint on line A—A of Fig. 6.
Fig. 8 is a similar view to Fig. 7 showing the second and third members partly flexed.

The members $b$ and $c$ are connected together by a joint of the link type so that the inner end of $c$ can move around the center of the outer end of the arm $b$ at a predetermined distance from said center. This link joint, which is shown on an enlarged scale in Figs. 7 and 8, comprises an intermediate piece $h$ located between the ends of the members $b$ and $c$. To this piece the outer end of the member $b^1$ is pivoted by the pin $b^*$. The inner end of the member $c$ carries a knuckle piece $c^3$ which engages with the intermediate piece $h$ when said member is extended in line with the member $b$, as shown in Fig. 7. The intermediate piece $h$ has semicircular recesses on its opposite sides to receive the rounded ends of the members $b$ and $c$, thereby producing a kind of double knuckle joint, the several parts of which are kept engaged by a link adapted to couple the adjacent ends of the members $b$ and $c$ together. This link can be conveniently formed by arranging the control cables in the manner hereinafter described. To prevent the entire pressure between the ends of the members $b$ and $c$ being taken by the intermediate piece, the ends of said members $b$ and $c$ are provided with concentrically arranged flanges $b^2$ and $c^2$ which bear against one another.

The two parts $c$ and $c^1$ are hinged together by a pin $x$ or its equivalent, the construction of the hinges being such that said parts can only fold in relation to one another in a rearward direction, and when the said parts are in line they are rigid so far as pressure from them is concerned.

Figure 5:
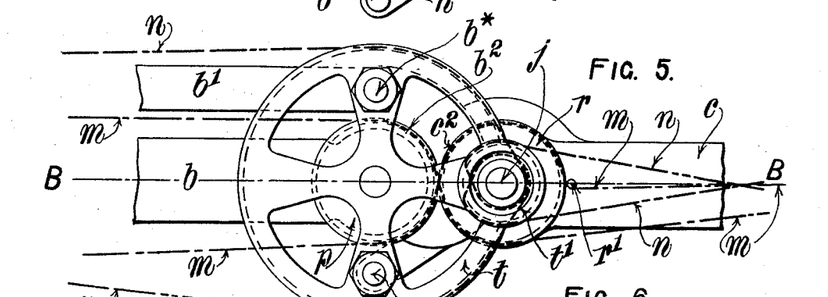
Fig. 5 is a broken view in inverted plan—on an enlarged scale—showing the construction of the joint between the second and third members of the structure, and the way the controlling cables are arranged with respect to said joint.
Figure 9:
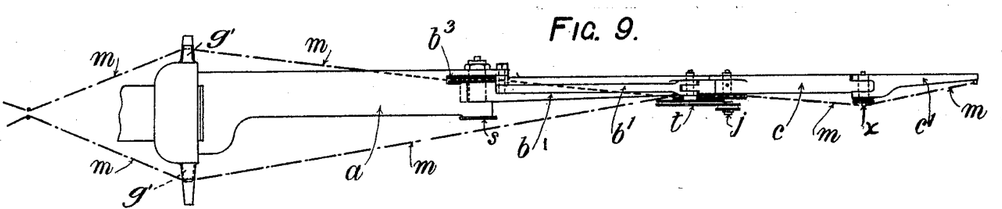
Figs. 9 and 10 are views in side elevation and plan respectively of the articulated structure showing the arrangement of one of the controlling cables.
Figure 17:
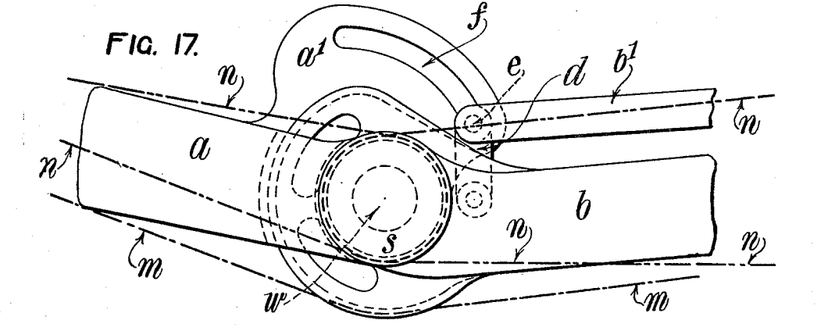
Figure 18:
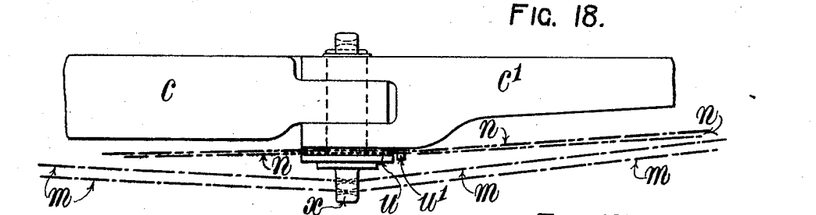
Figs. 18 and 19 are similar views of the joint between the two parts of the third member of the structure.
Figure 19:
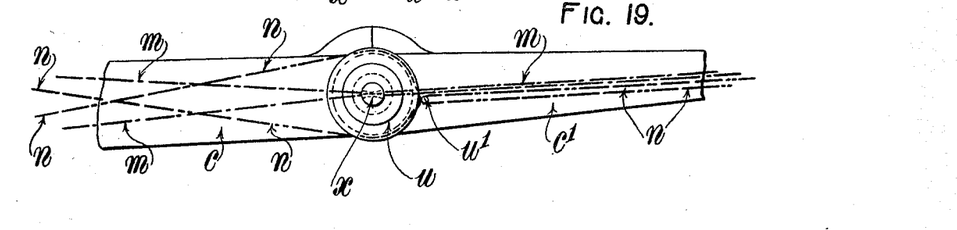

The members of the articulated structure are controlled by suitable cables, which are so arranged as to operate also as stays. Three main cables $m$ $n$ and $o$ are employed, which are arranged in the following manner:—The cable $m$ is shown in the accompanying drawings by a dot and dash line and is shown alone in Figs. 9 and 10 for the sake of distinctness. This cable after passing through a suitable guide $g$ located on the center line of the axis $v$ of the universal joint $v^*$ at a suitable distance above said axis passes to the rear of the articulated structure and over a boss or enlargement $b^3$ on the inner end of the member $b$ concentric with the joint at said end as shown in Fig. 17. Thence the cable passes to a drum $p$ fixed on the outer end of the member $b$ concentric with the joint at said end as shown in Fig. 5. After passing about a quarter around said drum ($p$) it passes to a drum $r$ fixed on the inner end of the member $c$ concentric with the joint at said end (see Fig. 5). After passing about half way around this drum ($r$) it passes around a pin $r^1$ mounted on the part $c$ on or near to the center line of said part and as near to the center of the joint at its inner end as possible. From the pin $r^1$ the cable passes to the extremity of the member $c^1$ through the center of the pin $x$ as shown in Figs. 18 and 19. From the extremity of the member $c^1$ to which it is made fast the cable passes back through the center of the pin $x$, thence around the drums $r$ and $p$ in the reverse direction to that which it took on its outward run, and thence directly back to the guide $g^1$ located diametrically opposite to the guide $g$ at a point some distance from and below the axis of the universal joint $v^*$. The two ends of the cable $m$ after passing the center of the joint $v$ pass to suitable centrally arranged guides $l$ to which the end of that part of the cable running to the rear of the articulated structure is made fast and the other end is connected to any suitable mechanism—not shown—for imparting motion to it for causing the member $b$ to fold forward with respect to the member $a$. This operative part of the cable $m$ is preferably constrained to keep within a reasonable distance of the joint between the first and second members by means of guides such as the guy ropes $m^1$ and $m^2$. It will be seen that this cable takes part both of the normal load on the wing plane and also any top load that may come on said plane, and, further, that it will resist torsional strain of the member $b$ on the member $a$, and, further, that by running it around the drums $p$ and $r$ in the manner described it operates also as a link to keep the several parts of the joint (by which the members $b$ and $c$ are coupled) together, thus dispensing with an independent link and pivotal pins.

Figure 6:
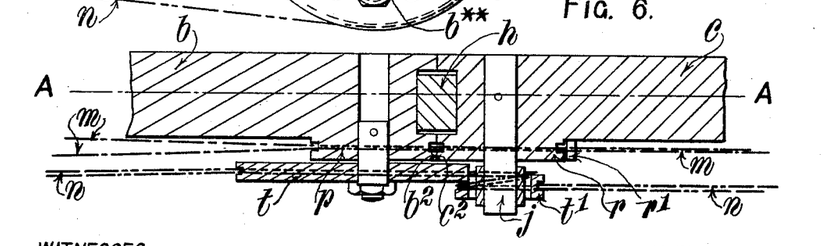
Fig. 6 is a broken view in section of said joint on line B—B of Fig. 5.
Figures 10, 11:
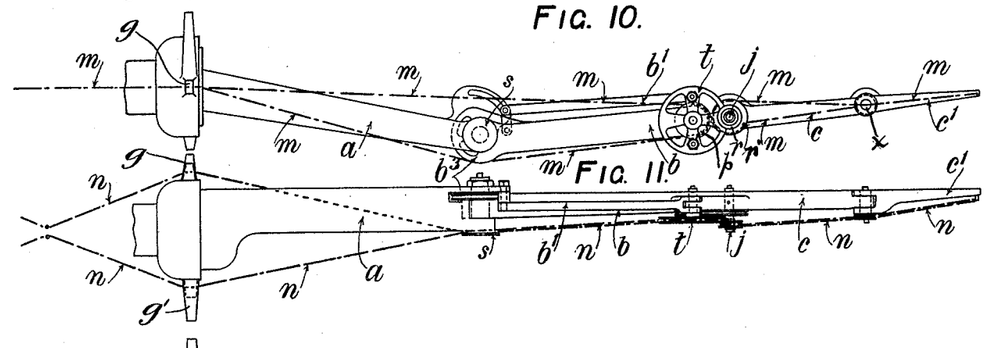
Figs. 11 and 12 are similar views showing the arrangement of another of the controlling cables.
Figure 12:
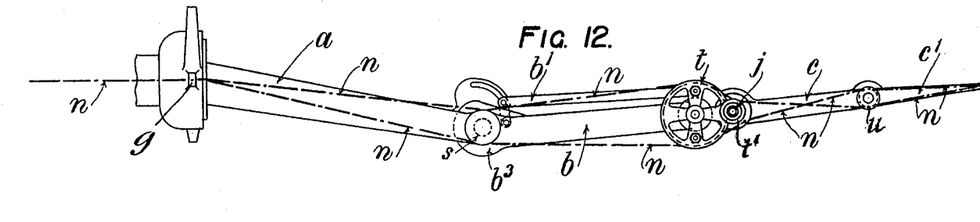
Figure 13:
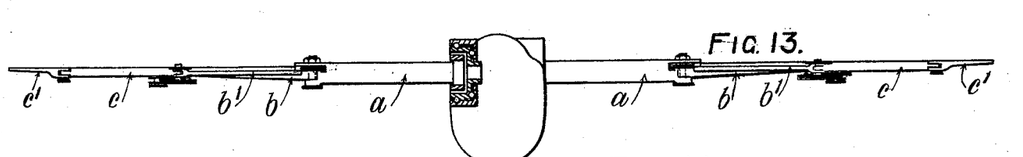
Figs. 13 and 14 are views—on a reduced scale—showing an aeroplane embodying this invention.
Figure 14:
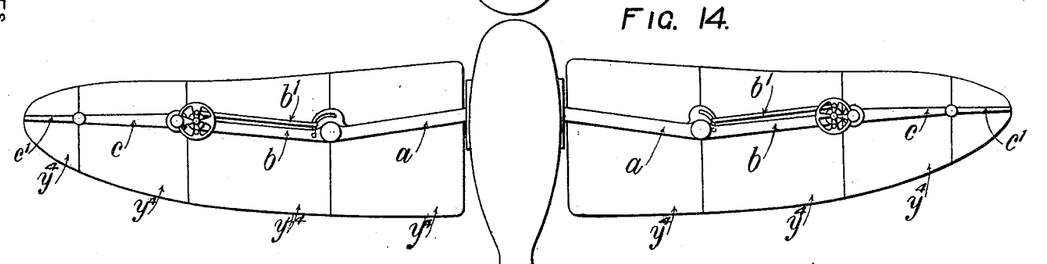
Figure 15:
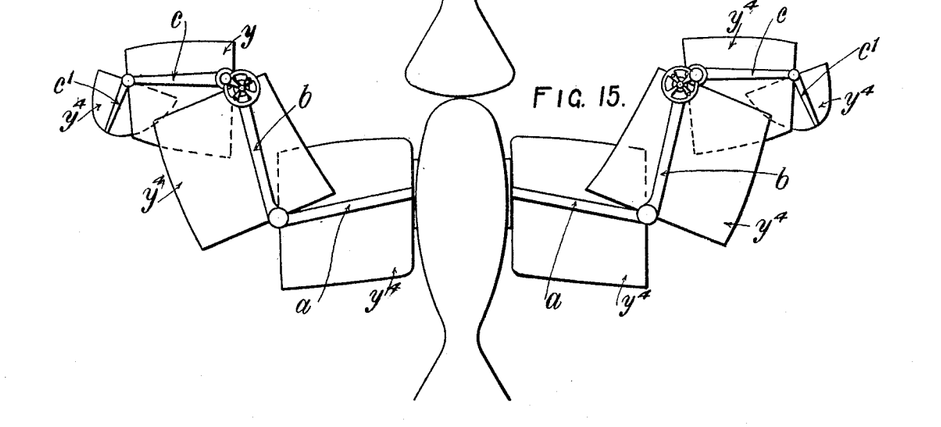
Fig. 15 is a view—on a reduced scale—showing by way of example how the supporting surfaces of the planes could be arranged to fold.
Figure 16:
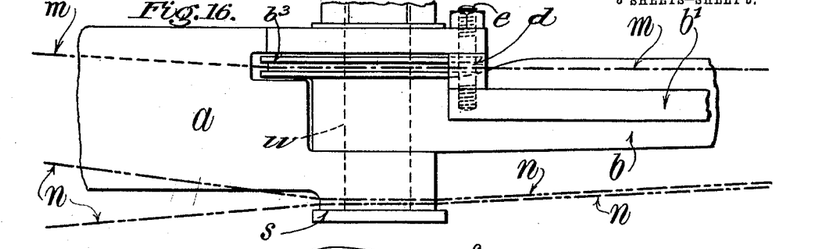
Figs. 16 and 17 are broken views in elevation and inverted plan respectively—on an enlarged scale—showing the construction of the joint between the first and second members of the articulated structure and the manner in which the controlling cables are arranged with respect to said joint.

The cable $n$ is shown in the accompanying drawings by double dot and double dash line, and is shown alone in Figs. 11 and 12 for the sake of distinctness. This cable after passing over the guide $g$ passes to the rear of the articulated structure and over a drum $s$ formed or fixed on the outer end of the member $a$ concentric with the joint at said end as shown in Fig. 17. From here the cable passes to a drum $t$ which is pivotally mounted on the outer end of the member $b$ concentric with the axis of said joint (see Figs. 5 and 6). This drum $t$ is fixed to the intermediate piece $h$ by means of pins $b^*$ and $b^{**}$, the former engaging the intermediate piece direct and forming the connection of the auxiliary member $b^1$ and the latter engaging an arm $h^1$ carried by the piece $h$. From the drum $t$ the cable passes to a spindle $j$ carried by the inner end of the member $c$ (Figs. 5 and 6). After passing partly around this spindle the cable is passed through a hole in the periphery of a small drum $t^1$ mounted eccentrically on the drum $t$. The cable is made fast to the drum in any convenient manner, and after passing partly around said drum crosses to the front part of the articulated structure and passes over a drum $u$ fixed on the inner end of the part $c^1$ (see Figs. 18 and 19). After passing partly around this drum it passes around a pin $u^1$ mounted on the part $c^1$ at or about the center line of said part and as near to the center of the joint at its inner end as possible. From this pin the cable is carried to the free end of the member $c^1$ to which it is made fast. It is then run back in the opposite manner to the guide $g^1$ being wrapped entirely around the drum $s$. If the outer member is composed of only one part $c$ the drum $t^1$ may be dispensed with and the cable made fast to the spindle $j$ and thence be guided to the free end of $c$.

The cable $o$ which is shown in the accompanying drawings by a double dot and single dash line is fixed at about the center of its length to the member $a$ at or near the outer end of said member by means of any suitable attachment. One end of this cable is then carried toward the universal joint $v^*$ in a downward and backward direction and the other end is carried toward said joint in an upward and forward direction, one end of said cable passing over a guide $g^2$ carried by the frame $y$ and the other end of said cable passing over a guide $g^3$ carried by said frame. From these guides the ends of the cable pass into the body of the machine.

Although it is preferred to employ single cables as hereinbefore described, in the belief that the source of weakness in the use of such arises not from the cables but from their attachments and connections, duplicate cables may be employed without departing from the spirit and scope of this invention.

It will be seen that owing to the action of the inner end of the member $c$ on the intermediate piece $h$ any torsion set up in the member $c$ produces a pressure against $h$, which rotating around the outer end of $b$ transmits this stress to $b^1$ and thence to $a$ as a compressional stress, and at the same time creates a tensional stress in that part of the cable $m$ running at the rear of the member $b$ between the joints by which said member is attached to the members $a$ and $c$.

To vary the shape, and therefore the effective area of the wing planes by flexing or extending them, the cables $m$ $n$ and $o$ are employed, $m$ and $o$ being preferably so connected together that they can be operated by the pilot by a single movement, the cable $n$ coming into operation automatically when the member $b$ is moved in relation to the member $a$ by means of the cable $m$.

To vary the angle of direction a pull is exerted on the end of the part of the cable $o$ lying above and in advance of the articulated structure while the end of the other part of said cable is slackened.

To vary the dihedral angle, a pull is exerted on the ends of all the three cables $m$ $n$ and $o$ which are located on one side of the articulated structure while the ends of those on the other side are slackened.

Figure 1:
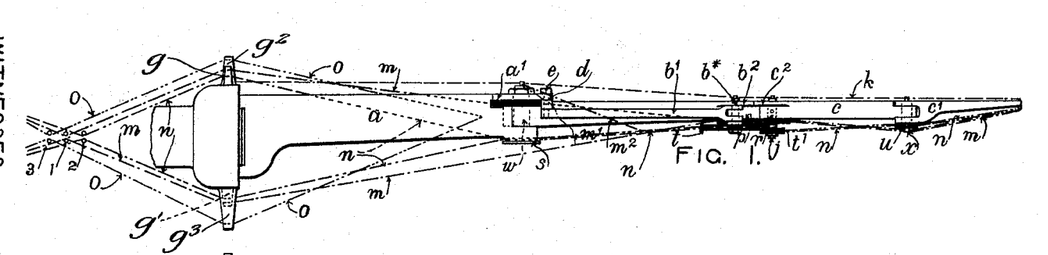
—Figure 1 is a view in elevation of the articulated structure showing the same fully extended.
Figures 2, 3, 4:
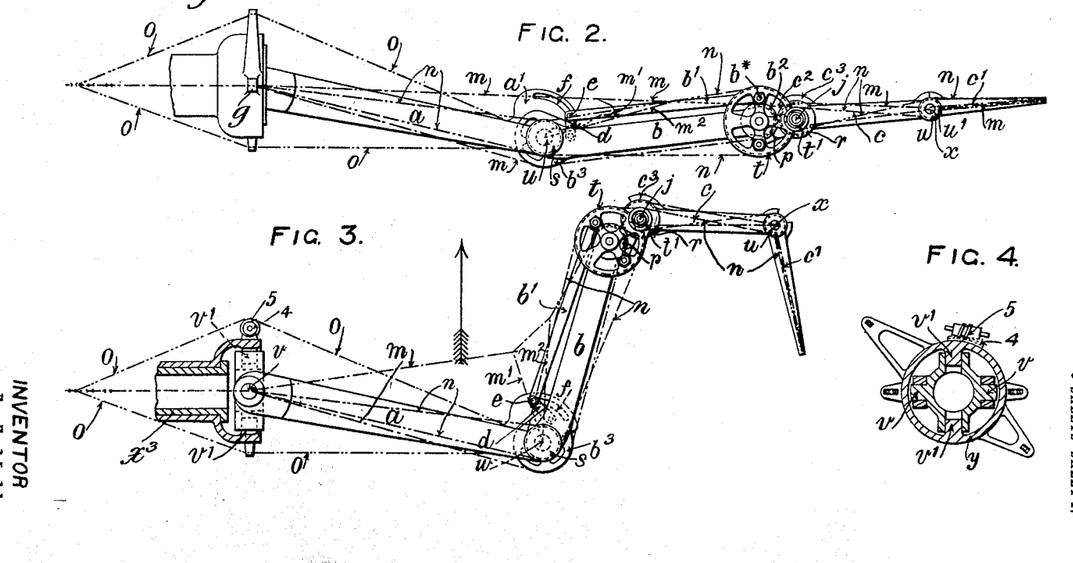
Fig. 2 is a corresponding view in inverted plan.
Fig. 3 is a view in inverted plan showing the structure partly flexed.
Fig. 4 is a view in end elevation of the universal joint by which the inner member of the structure is attached to the frame or body of the machine.

To vary the angle of incidence, the frame carrying the axes of the universal joint is rotated about its axis $z$ by means of a worm 4 and a worm wheel 5 as shown in Figs. 3 and 4 or by any other suitable mechanism.

It will be seen that by this construction the lengths of the cables are not varied by any movement of any one member of the structure relative to one another and that in all positions said members can assume said cables operate as tension stays. Further, none of the cables requires a wire strainer or a joint on or within any part of the articulated structure, which enables the material to be used to the fullest efficiency, nor—which is of still more importance—have any of the cables any relative movement with respect to any of the pulleys or drums in any part of the structure. The only movement required of the cables is to coil or uncoil around relatively stationary drums or pulleys, and that to an extent so slight as to be scarcely perceptible. This reduces the resistance to manipulation to a minimum and gives a maximum of strength and reliability in action.

The members $a$ $b$ and $c$ of the articulated structure carry suitable plane sections such as $y^4$ to form the supporting surfaces, said sectional surfaces being so arranged that they are operative both when the structure is extended and when same is more or less flexed or folded, and also so that they do not interfere with either the partial or complete folding of the structure. The sections are preferably composed of a series of elements similar to the feathers of a bird, but this forms no part of the present invention. To stiffen the articulated structure a permanent stay such as $k$, shown in the accompanying drawings by a single dot and double dash line, may be run from the center of the joint $v$ at a suitable distance above the axis of said joint to the free end of the member $c^1$, said stay passing through the centers of all the joints of the various members of the articulated structure so that its length is not varied when said structure is flexed.

The three cables $m$ $n$ and $o$ are carried from the universal joint to suitable guide pulleys 1 2 and 3 which are centrally arranged in relation to said joint within the frame or body of the machine, from whence they pass to suitable controlling apparatus—which forms no part of this invention—adapted to be manipulated by the pilot so that he is able during flight to extend or contract the articulated structures carrying the wing planes either simultaneously or independently for the purpose of varying their area, leverage, and frontal aspect, to point both articulated structures either forward or rearward simultaneously for the purpose of varying the angle of direction, to tilt the articulated structures simultaneously or independently for the purpose of varying the angle of incidence or for steering purposes, and to raise or lower the articulated structures either simultaneously or independently for the purpose of varying the dihedral angle.

What I claim as my invention and desire to secure by Letters Patent is:—

1. An articulated structure for the support of the wing planes of aeroplanes comprising three members, the first or inner one of which consists of a single member which is attached to the frame or body of the machine by a universal joint, the second of which is coupled to the outer end of the first or inner member by a vertically arranged joint, and the third or outer member of which is coupled to the outer end of the second member by a link joint; an intermediate piece in said link joint operating between the adjacent ends of the second and third members; an auxiliary member located in front of the second member; and means for coupling said auxiliary member to the first and third members so that in any position said members can assume in relation to one another any torsional stresses set up in the third or outer member are transmitted to the first or inner member in the form of compressional stresses, as set forth.

2. An articulated structure for the support of the wing planes of aeroplanes comprising a plurality of members, the first or inner of which is coupled or attached to the frame or body of the machine by a universal joint, the second of which is pivoted to the ends of the first or inner member by a joint the axis of which lies in a vertical plane in relation to the supporting surfaces of the plane, the third of which is coupled to the outer end of the second member by a link joint having an intermediate piece by means of which the inner end of the third member moves around the outer end of the second member at a predetermined distance from same; an auxiliary second member arranged in approximately parallel relation to and in front of the first member, said auxiliary second member being pivoted to the intermediate piece at one end and connected both to the outer end of the first or inner member and to the inner end of the second member by link work which while allowing relative movement between the first and second members about the joint by which they are coupled together will cause the auxiliary member at all times to take an abutment against the first member, as set forth.

3. In an articulated structure for the support of the wing planes of aeroplanes, the combination with a plurality of members pivoted together so as to form the articulated structure, of a cable for controlling the folding and extension of the second member in relation to the first member, of a cable for automatically folding and extending the third member in relation to the second member, of a cable for varying the positions of the members of the structure in relation to the frame of the body of the machine for the purpose of varying the angle of direction, and of means for rocking the structure about the joint by which it is coupled to the frame or body of the machine for the purpose of varying the angle of incidence.

4. In supporting planes for aeroplanes, the combination with a plurality of members pivoted together so as to form an articulated structure capable of carrying the supporting elements, of a cable running from a position above the center of the universal coupling by which the first or inner member is attached to the frame or body of the machine to and over a drum carried by the inner end of the second member and from thence to and around a drum carried by the inner end of the ond member where it crosses over and passes around a drum carried by the inner end of the third member and over a guide pin mounted on said third member as near to the center line of said member and to the center of the drum carried by said member as possible, from whence it runs to the end of the third member where it is made fast and from whence it returns to and around the drums carried by the third and second members but in the reverse direction to that which it takes on its outward run, from whence it runs through suitable guys or guides direct to a point below the center of the universal coupling by which the first or inner member is coupled to the frame or body of the machine.

5. In supporting planes for aeroplanes, the combination with a plurality of members pivoted together so as to form an articulated structure for carrying the supporting elements, of a cable running from a position above the center of the universal joint by which the first member is attached to the frame or body of the machine to and around a drum fixed on the inner end of the second member, thence over a drum carried by the intermediate piece between the ends of the second and third members, thence around a pin carried by the inner end of the third member to which it is made fast, thence to the end of said third member, from whence it runs back through the several joints in an opposite manner and direction to a point below the center of the universal coupling.

6. In aeroplanes having supporting planes each of which consists of an articulated structure carrying suitable supporting elements, the combination of a first or inner member coupled or attached to the frame or body of the machine by a universal joint, of a second member pivoted to the end of the first or inner member, of a third member coupled to the outer end of the second member by a link joint having an intermediate piece by means of which the inner end of the third member moves around the outer end of the second member at a predetermined distance from same; of an auxiliary member mounted in front of the second member, one end of said auxiliary second member being pivoted to the intermediate piece, and the other end being connected both to the outer end of the first or inner member and to the inner end of the second member by link work; of a cable for controlling the folding and extension of the second member in relation to the first member; of a cable for automatically folding and extending the third member in relation to the second member; of a cable for varying the positions of the structures of the planes in relation to the frame of the body of the machine for the purpose of varying the angle of direction; and of means for rocking the structures about the joints at which they are coupled to the frame or body of the machine for the purpose of varying the angle of incidence.

7. In supporting planes for aeroplanes, the combination of a plurality of members jointed to one another so as to form an articulated structure by axes arranged in the vertical plane, the first or inner member being connected to the frame of the body of the machine by a universal joint, the second member being pivoted to the first member so that it will fold forward in relation to said first or inner member, i. e. in the direction of flight, and the third or outer member being pivoted to the second member so that it will fold backward in relation to the second member; of a cable for controlling the folding and extension of the second member in relation to the first member; of a cable for automatically folding and extending the third member in relation to the second member; of a cable for varying the positions of the structures of the planes in relation to the frame of the body of the machine for the purpose of varying the angle of direction; and of means for rocking the structures about the joints at which they are coupled to the frame or body of the machine for the purpose of varying the angle of incidence.

8. In supporting planes for aeroplanes, the combination of a member $a$ coupled or attached to the frame or body of the machine by a universal joint $v^*$, a second member $b$ pivoted to the outer end of $a$ by a joint the axis of which lies in a plane vertical in relation to the supporting surfaces of the plane, a third member $c$ coupled to the outer end of $b$ by a link joint the axes of which lie in a plane vertical in relation to the supporting surfaces of the plane, an intermediate piece $h$ located between the inner end of $c$ and the outer end of $b$ whereby the former is constrained to move around the outer end of the latter at a predetermined distance from same, an auxiliary member $b^1$ arranged in front of the member $b$ and connected at one end to the intermediate piece $h$ and at the other end to the inner end of the member $b$ by a link $d$ and to the outer end of the member $a$ by a pin $e$ and cam-shaped guide $f$, a cable $m$ running from a position above the center of the universal coupling by which the member $a$ is attached to the frame or body of the machine to and over a drum $b^3$ carried by the inner end of the member $b$ and thence to and around a drum $p$ on the outer end of the member $b$ where it crosses over and passes around a drum $r$ carried by the inner end of the member $c$, whence it runs to the end of the said member $c$ where it is made fast and from whence it returns to and around the drums $r$ and $p$ but in a reverse manner and direction, from whence it runs through suitable guides direct to a point below the center of the universal coupling, a cable *n* running from a position above the center of the universal joint by which the member *a* is attached to the frame or body of the machine to and around a drum *s* fixed on the inner end of the member *b*, thence over a drum *t* carried by the intermediate piece *h* between the adjacent ends of the members *b* and *c*, thence around a pin *j* carried by the inner end of the member *c* to which it is made fast, thence to the end of said member *c*, from whence it runs back through the several joints in an opposite manner and direction to a point below the center of the universal joint, and a cable *o* running from a point above and in advance of the center of the universal coupling to a point at or near the outer end of the member *a* where it is made fast and runs back to a point below and to the rear of the center of said universal coupling.

9. In supporting planes for aeroplanes, the combination of a member *a* coupled or attached to the frame or body of the machine by a universal joint, a second member *b* pivoted to the outer end of *a* by a joint the axis of which lies in a plane vertical in relation to the supporting surface of the plane, and a third member *c* coupled to the outer end of *b* by a link joint the axes of which lie in a plane vertical in relation to the supporting surface of the plane, an intermediate piece *h* located between the inner end of *c* and the outer end of *b*, a fourth member $c^1$ pivoted to the outer end of the member *c* by a joint the axis of which lies in a plane vertical in relation to the supporting surfaces of the plane and which will allow the member $c^1$ to fold in a backward direction only, an auxiliary member $b^1$ arranged in front of the member *b* and connected at one end to the intermediate piece *h* and at the other end to the inner end of the member *b* by a link *d* and to the outer end of the member *a* by a pin *e* and cam-shaped guide *f*, a cable *m* running from a position above the center of the universal coupling by which the member *a* is attached to the frame or body of the machine to and over a drum $b^3$ carried by the inner end of the member *b* and thence to and around a drum *p* on the outer end of the member *b* where it crosses over and passes around a drum *r* carried by the inner end of the member *c*, whence it runs through the joint by which the member $c^1$ is attached to the member *c* to the end of the member $c^1$ where it is made fast and from whence it returns to and around the drums *r* and *p*, but in a reverse manner and direction, from whence it runs through suitable guides direct to a point below the center of the universal coupling, a cable *n* running from a position above the center of the universal joint by which the member *a* is attached to the frame or body of the machine to and around a drum *s* fixed on the inner end of the member *b*, thence over a drum *t* carried by the intermediate piece *h* between the adjacent ends of the members *b* and *c*, thence around a pin *j* carried by the inner end of the member *c* to which it is made fast, thence it crosses over and passes around a drum *u* and a pin $u^1$ both carried by the inner end of the member *c* and runs to the end of said member *c* where it is made fast and from whence it runs back through the several joints in an opposite manner and direction to a point below the center of the universal joint, and a cable *o* running from a point above and in advance of the center of the universal joint to a point at or near the outer end of the member *a* where it is made fast and runs back to a point below and to the rear of the center of said universal joint.

In testimony whereof I have signed my name in the presence of two subscribing witnesses.

ALEXANDER ALBERT HOLLE.

Witnesses:
 P. PHILDERING,
 D. KLEYN.

---

Copies of this patent may be obtained for five cents each, by addressing the "Commissioner of Patents, Washington, D. C."